March 9, 1937.  O. E. ANDRUS  2,072,976

WATER PURIFICATION

Filed Sept. 19, 1932

INVENTOR.

Orrin E. Andrus

Patented Mar. 9, 1937

2,072,976

UNITED STATES PATENT OFFICE 2,072,976

WATER PURIFICATION

Orrin E. Andrus, Milwaukee, Wis.

Application September 19, 1932, Serial No. 633,769

3 Claims. (Cl. 210—36)

This invention relates to water purification, and particularly to a device for purifying cistern water or drinking water for household or office use.

The object of the invention is to provide a convenient and safe chemical cartridge for use by householders in purifying small bodies or batches of water.

Another object is to provide a cartridge which will serve as a storage and transporting case for the chemicals used in purifying water.

Another object is to provide a suitable cartridge for accurately introducing the correct proportions of chemicals to a body of water to form a purifying coagulum and to insure an excess of basicity in the water.

Another object is to provide a cartridge which will distribute the reacting chemicals uniformly in dilute solution, thereby insuring a satisfactory coagulum for purifying purposes.

Another object is to provide a cartridge capable of introducing chemicals into a container of water in such a manner as to positively eliminate the danger of soluble chemicals passing in an undissolved or concentrated form to the bottom of the container or within the filter bed.

Another object is to provide a cartridge capable of introducing and dispersing an insoluble purifying agent in a batch of water.

Purification as practiced by the invention includes the total or partial removal of turbidity, color, living organisms, hardness, taste, and odor from the water. Usually the most undesirable impurities are the insoluble materials in suspension in the water, as clay, silt, finely divided organic matter and microscopic animal and vegetable organisms. Another class of undesirable impurities includes soluble materials which give to the water an undesirable color, taste, or odor. A third class of impurities, which includes soluble calcium, magnesium and iron salts, constitutes the hardness of the water.

In the practice of the invention, one or more chemicals are dissolved in the water and react with each other or with soluble impurities to form a coagulum, the particles of which form around the insoluble impurities which are in suspension. The coagulum containing the impurities is then allowed to settle to the bottom or the water is filtered to separate the same. Such a coagulum usually possesses the property of adsorbing small amounts of some dissolved substances possessing color, odor, or taste. The chemicals added may also react with the dissolved calcium and magnesium salts, thereby partially or totally softening the water.

In order to adsorb more effectively odors and tastes, particularly from drinking water, powdered charcoal is agitated with the water preferably in conjunction with the coagulating chemicals. The coagulum also aids in the removal of the suspended charcoal.

The accompanying drawing illustrates a cartridge made in accordance with the invention.

Figure 1:
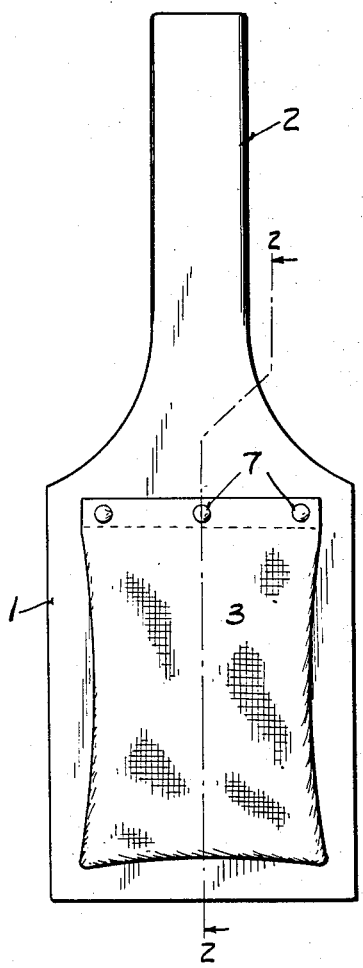
Fig. 1 is a side elevation of the device.
Figure 2:
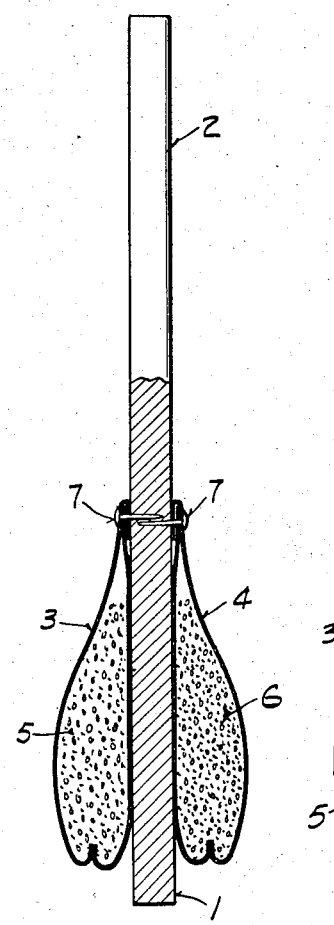
Fig. 2 is a section on line 2—2 of Fig. 1.
Figure 3:
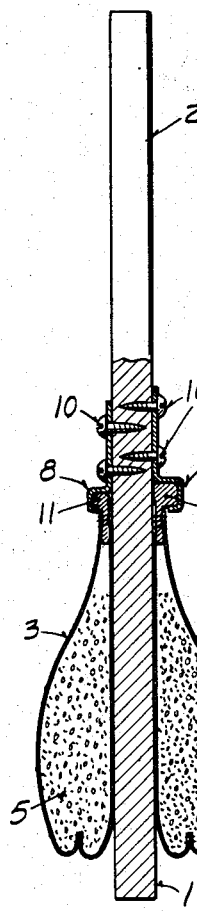
Fig. 3 is a section of a modification of the device illustrated in Fig. 1.
Figure 4:
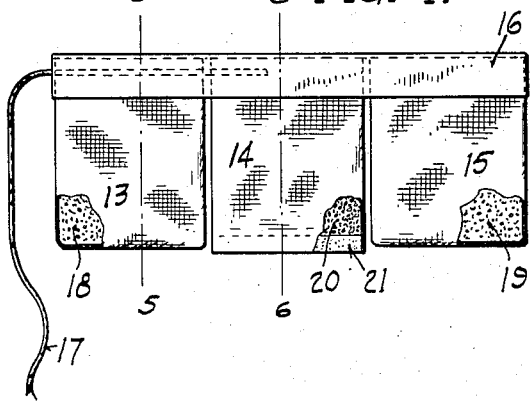
Fig. 4 is an elevation of a modified form of the invention.
Figures 5, 6:
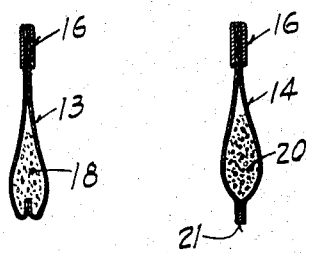
Fig. 5 is a section on line 5—5 of Fig. 4.
Fig. 6 is a section on line 6—6 of Fig. 4.

The embodiment illustrated in Figs. 1, 2, and 3 is preferred for use in purifying cistern water or similar bodies of water, while the embodiment illustrated in Figs. 4, 5, and 6 is adapted for use in devices such as that set forth and claimed in applicant's copending application Serial No. 633,768, filed September 19, 1932, for Purifier for drinking water.

The embodiment of Figs. 1, 2, and 3 consists generally of a metal or wood paddle 1 having a handle 2.

Porous containers 3 and 4 are fastened to the respective opposite sides of the paddle. The containers 3 and 4 are preferably cloth bags, although any containers having partially or completely porous surfaces may be used. The bags are filled with chemicals, which when dissolved in water, react to produce a coagulating material such as aluminum hydroxide or iron hydroxide.

For this purpose bag 3 may contain sodium bicarbonate 5, and bag 4 may contain aluminum sulphate 6. Some of the chemicals which may be substituted in place of sodium bicarbonate include: borax, lime, soda ash, sodium silicate, sodium aluminate, etc., while alum or iron sulphate may be substituted for the aluminum sulphate. The proportion of the chemicals is such that when the total contents of each bag has dissolved in the water to be purified and the reaction therebetween has been completed, there is a small excess of the base sodium bicarbonate and no soluble aluminum sulphate salt left in the water. The proportion found suitable for most waters is 10 parts by weight of sodium bicarbonate, $NaHCO_3$, to 9 parts by weight of aluminum sulphate, $Al_2(SO_4)_3.18H_2O$. Where other chemicals are employed, or where different water is being purified, the proportion may be changed to obtain the desired results.

The actual quantities of the chemicals in the bags 3 and 4 may be governed, apart from the proportions above specified, in accordance with the volume and impurities of the water to be purified. For average rain water cisterns of 200 to 1000 cubic feet capacity, about 1 lb. of aluminum sulphate and about 1 lb. and 2 oz. of sodium bicarbonate will be found satisfactory.

The bags 3 and 4 are preferably permanently attached to the paddle 1 by nails 7, rivets, or other suitable means, thereby insuring against disastrous mistakes due to incorrect proportions of chemicals, as may result from the use of but one of the bags or from two bags of the same chemical content.

However, the bags 3 and 4 may be detachably fastened to the paddle 1, so that they may be removed and filled bags attached ready for another operation upon completion of a purifying operation. In such a case the nails 7 of Figs. 1 and 2 are replaced with fasteners adapted for holding detachable bags as illustrated in Fig. 3. Metal clips 8 and 9, preferably not interchangeable, are secured to the paddle 1 by means of screws 10. The construction of the fasteners is preferably such as to prevent two bags of the same chemical content being attached to the paddle simultaneously, bags of different chemical content being provided at their tops with different sized beads 11 and 12 to fit their respective fasteners. This feature largely eliminates the possibility of making serious mistakes in the kind of chemicals employed.

The operation of purifying water with the device is simple. The cartridge is gripped by the handle and dipped into the body of water to be purified, and is moved back and forth in the water to cause agitation of the entire body of water for a period of time sufficient to allow the chemicals in both bags to become completely mixed or dissolved in the water. The empty cartridge is then withdrawn. The dissolved chemicals react in dilute solution to produce a coagulum which adsorbs or surrounds the impurities, and during the course of a few hours, settles to the bottom of the container taking most of the impurities with it.

The embodiment illustrated in Figs. 4, 5, and 6 has the bags 13, 14, and 15 sealed and supported by the metal clip 16 having a cord 17 attached to one end. The coagulum forming chemicals 18 and 19 are held in the bags 13 and 15. This form of cartridge is better adapted for small portable bodies of water, as in the purification of a bottle of drinking water where the water may be agitated with respect to the cartridge by giving the bottle a motion. This cartridge is also adaptable for use in conjunction with a separate paddle employed for agitating the water.

When the device is employed with apparatus similar to that disclosed in the copending application above referred to, very efficient purification of a batch of drinking water is obtained. The cartridge, preferably in the form illustrated in Figs. 4 to 6, inclusive, (although that illustrated in Figs. 1 to 3, inclusive, may be employed) is suspended in the water with the cord 17 extending out through the mouth of the bottle or container. A stopper is then inserted in the mouth of the container, thereby holding the cord in place and preventing the cartridge from dropping to the bottom of the container. The container is then shaken to obtain dispersing and dissolving of the chemicals 18 and 19 throughout the water. The chemicals then react, forming a purifying coagulum, which is subsequently removed by filtration through a sand bed as more specifically set forth in the co-pending application.

Particularly in purifying drinking water, the addition of a small amount of powdered charcoal is desirable as an aid in removing soluble odors, tastes, and color. The charcoal may be added separately from the cartridge or as a part of the cartridge. The bag may be sufficiently porous to allow the charcoal to pass through in water suspension, or it may be sealed with a soluble or removable seal. In Figs. 4 and 6, the powdered charcoal 20 is held in a bag 14 sealed at one or more edges by a water soluble glue or adhesive 21 such as dextrin. The bag 14 is preferably of tight weave cloth. When the cartridge is placed in water, the sealing material 21 dissolves and allows the powdered charcoal to become suspended in the water. A bag, such as 14, filled with charcoal may also be attached to the paddle 2 illustrated in Figs. 1 to 3, inclusive, if desired.

Defective drinking water usually can be greatly improved in wholesomeness and palatability by treatment with a combination of coagulating chemicals and adsorbing charcoal. An effective proportion for an average defective drinking water is 0.6 gram powdered charcoal, 1.0 gram sodium bicarbonate and 0.9 gram aluminum sulphate to 4 gallons of water. Other proportions of chemicals may be employed within the scope of the invention. In cases where sufficient basicity exists in the raw water, the addition of sodium bicarbonate or equivalent chemical may be dispensed with. Although it is most convenient to introduce the chemicals simultaneously, it lies within the scope of the invention to introduce them separately.

I claim:

1. An apparatus for introducing chemicals in a batch of water, comprising a substantially non porous paddle adapted to stir the water and a plurality of replaceable porous containers attached to said paddle on opposite sides thereof and containing separate chemicals adapted to be dispersed separately throughout the water by agitation of the water with said paddle.

2. An apparatus for dissolving purifying or cleaning chemicals in a batch of water, comprising a paddle adapted to stir the water during the dissolving process, and a plurality of replaceable porous containers attached to said paddle and separated thereby, said containers having therein different chemicals adapted to be dissolved separately in the water and to react therein to form a purifying coagulum.

3. The method of purifying and cleaning water which comprises independently dissolving different chemicals substantially simultaneously from porous containers into a batch of water to be treated to prevent settling of the chemicals in solid form, maintaining the points of application of the chemicals sufficiently spaced to prevent premature reaction of the chemicals in concentrated form, agitating the water and disseminating said chemicals throughout the batch of water, and thereafter allowing said chemicals to react to form a coagulum for removing impurities from the water.

ORRIN E. ANDRUS.